(12) United States Patent
Kanai

(10) Patent No.: US 9,780,855 B2
(45) Date of Patent: *Oct. 3, 2017

(54) TRANSMISSION CONTROL APPARATUS AND COMPUTER READABLE MEDIUM

(71) Applicant: SoftBank Corp., Tokyo (JP)

(72) Inventor: Takeo Kanai, Mission Viejo, CA (US)

(73) Assignee: SoftBank Corp., Tokyo (JP)

( * ) Notice: Subject to any disclaimer, the term of this patent is extended or adjusted under 35 U.S.C. 154(b) by 80 days.

This patent is subject to a terminal disclaimer.

(21) Appl. No.: 14/879,102

(22) Filed: Oct. 9, 2015

(65) Prior Publication Data

US 2016/0036509 A1    Feb. 4, 2016

Related U.S. Application Data

(63) Continuation of application No. PCT/JP2014/003538, filed on Jul. 2, 2014.

(51) Int. Cl.
*H04B 7/06* (2006.01)
*H01Q 3/30* (2006.01)
*H01Q 21/24* (2006.01)
*H04L 1/06* (2006.01)
(Continued)

(52) U.S. Cl.
CPC ............ *H04B 7/0613* (2013.01); *H01Q 3/30* (2013.01); *H01Q 21/24* (2013.01); *H01Q 21/28* (2013.01); *H04L 1/0668* (2013.01); *H04B 7/10* (2013.01)

(58) Field of Classification Search
None
See application file for complete search history.

(56) References Cited

U.S. PATENT DOCUMENTS 7,715,495 B2 * 5/2010 Ahn ................. H04B 7/0669
375/299
2009/0034643 A1    2/2009 Ahn et al.
(Continued)

FOREIGN PATENT DOCUMENTS

JP    2003-142940 A    5/2003

OTHER PUBLICATIONS

Siavash M. Alamouti., "A Simple Transmit Diversity Technique for Wireless Communication," IEEE Journal on Select Areas in Communication, vol. 16, No. 8, Oct. 1998, pp. 1451-1458.
(Continued)

*Primary Examiner* — Hassan Phillips
*Assistant Examiner* — Gautam Sharma

(57) ABSTRACT

Provided is a transmission control apparatus that, at a first transmission timing, causes a first symbol to be transmitted from a first antenna, causes the first symbol having the same phase as the first symbol transmitted from the first antenna to be transmitted from a second antenna that is orthogonal to the first antenna and has a path to a mobile terminal that is the same as a path between the first antenna and the mobile terminal, causes a second symbol to be transmitted from a third antenna arranged parallel to the first antenna, and causes the second symbol having the inverse phase of the second symbol transmitted from the third antenna to be transmitted from a fourth antenna that is orthogonal to the third antenna and has a path to the mobile terminal that is the same as a path between the third antenna and the mobile terminal.

8 Claims, 8 Drawing Sheets

| | FIRST ANTENNA | SECOND ANTENNA | POLARIZATION PLANE |
|---|---|---|---|
| t=0 | $+S_1$ | $+S_1$ | ↑ |
| t=1 | $-S_2^*$ | $-S_2^*$ | ↑ |
| t=2 | $-S_3$ | $+S_3$ | → |
| t=3 | $+S_4^*$ | $-S_4^*$ | → |
| ⋮ | ⋮ | ⋮ | ⋮ |

| | THIRD ANTENNA | FOURTH ANTENNA | POLARIZATION PLANE |
|---|---|---|---|
| t=0 | $+S_2$ | $-S_2$ | ← |
| t=1 | $+S_1^*$ | $-S_1^*$ | ← |
| t=2 | $+S_4$ | $+S_4$ | ↑ |
| t=3 | $+S_3^*$ | $+S_3^*$ | ↑ |
| ⋮ | ⋮ | ⋮ | ⋮ |

(51) Int. Cl.
H01Q 21/28 (2006.01)
H04B 7/10 (2017.01)

(56) References Cited

U.S. PATENT DOCUMENTS

| | | | | |
|---|---|---|---|---|
| 2009/0219960 A1* | 9/2009 | Uberna | ............ | G02B 27/1006 |
| | | | | 372/27 |
| 2010/0144289 A1* | 6/2010 | Haskell | ................ | H01Q 1/246 |
| | | | | 455/83 |
| 2010/0246494 A1* | 9/2010 | Sanayei | .............. | H04B 7/0417 |
| | | | | 370/328 |
| 2012/0189076 A1 | 7/2012 | Khan et al. | | |
| 2013/0044650 A1* | 2/2013 | Barker | ................ | H04B 7/0617 |
| | | | | 370/278 |
| 2013/0257655 A1* | 10/2013 | Hu | ...................... | H04B 7/0408 |
| | | | | 342/373 |

OTHER PUBLICATIONS

Nokia Siemens Networks, Nokia, Rank 1-2 codebook design for further downlink MIMO enhancement, 3GPP TSG-RAN WG1#73 R1-132731, May 24, 2013.

Kumar Das Nirmal et al., "Development of a MIMO Experimental System having a Function of Space and Polarization Diversity", IEICE Technical Report MW, Micro-ha, 103(236), The Institute of Electronics, Information and communication Engineers, Jul. 23, 2003 (Jul. 23, 2003), pp. 133 to 138.

International Search Report for International Application No. PCT/JP2014/003538, issued by the Japan Patent Office on Sep. 22, 2014.

International Preliminary Report on Patentability for International Application No. PCT/JP2014/003538, issued by the International Bureau of WIPO on Jan. 12, 2017.

* cited by examiner

|  | FIRST ANTENNA | SECOND ANTENNA | POLARI-ZATION PLANE |
|---|---|---|---|
| t=0 | $+S_1$ | $+S_1$ | ↑ |
| t=1 | $-S_2^*$ | $-S_2^*$ | ↑ |
| t=2 | $-S_3$ | $+S_3$ | → |
| t=3 | $+S_4^*$ | $-S_4^*$ | → |
| ⋮ | ⋮ | ⋮ | ⋮ |

|  | THIRD ANTENNA | FOURTH ANTENNA | POLARI-ZATION PLANE |
|---|---|---|---|
| t=0 | $+S_2$ | $-S_2$ | ← |
| t=1 | $+S_1^*$ | $-S_1^*$ | ← |
| t=2 | $+S_4$ | $+S_4$ | ↑ |
| t=3 | $+S_3^*$ | $+S_3^*$ | ↑ |
| ⋮ | ⋮ | ⋮ | ⋮ |

TRANSMISSION CONTROL APPARATUS AND COMPUTER READABLE MEDIUM

The contents of the following PCT patent application are incorporated herein by reference:
PCT/JP2014/003538 filed on Jul. 2, 2014

BACKGROUND

1. Technical Field

The present invention relates to a transmission control apparatus and a computer readable medium.

2. Related Art

An Alamouti STBC (Space Time Block Code) is known as an encoding method for MIMO (Multiple Input Multiple Output), as shown in Non-Patent Document 1, for example. Furthermore, one known restriction for an Alamouti 2×1 space time diversity technique is that this technique can only be used for two transmission antennas, as shown in Patent Document 1, for example.

PRIOR ART DOCUMENTS

Patent Document 1: Japanese Patent Application Publication No. 2012-080564
Non-Patent Document 1: Siavash M. Alamouti., "A simple Transmit Diversity Technique for Wireless Communication," IEEE JOURNAL ON SELECT AREAS IN COMMUNICATION, Vol. 16, No. 8, October, 1998

A more effective data transfer technique using a plurality of antennas is desired.

DESCRIPTION OF EXEMPLARY EMBODIMENTS

Hereinafter, some embodiments of the present invention will be described. The embodiments do not limit the invention according to the claims, and all the combinations of the features described in the embodiments are not necessarily essential to means provided by aspects of the invention.

Figure 1:
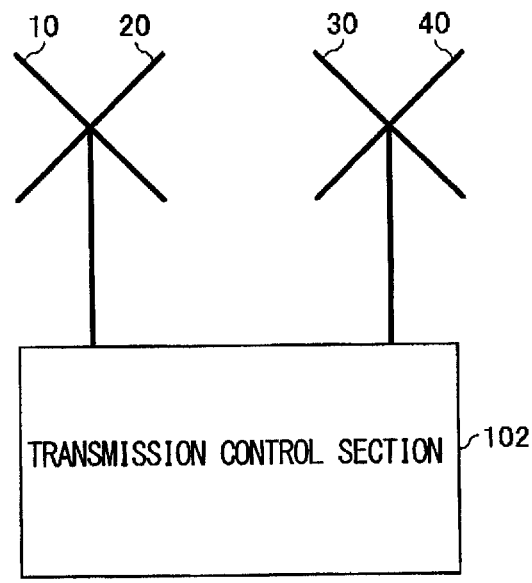
FIG. 1 is a schematic view of an exemplary function configuration of a transmission control apparatus.
Figure 1:
Figure 1:
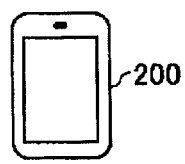

FIG. 1 is a schematic view of an exemplary function configuration of a transmission control apparatus 100. The transmission control apparatus 100 according to the present embodiment communicates wirelessly with a mobile terminal 200. The mobile terminal 200 may be any terminal that is capable of wireless communication, and may be a mobile telephone such as a smart phone, a tablet terminal, or a PC (Personal Computer), for example.

The transmission control apparatus 100 may communicate wirelessly with a plurality of mobile terminals 200. The transmission control apparatus 100 may be a wireless communication base station. For example, the transmission control apparatus 100 may be an eNB (evolved Node B). As another example, the transmission control apparatus 100 may be a wireless LAN access point.

The transmission control apparatus 100 includes a first antenna 10, a second antenna 20, a third antenna 30, a fourth antenna 40, and a transmission control section 102. The first antenna 10, the second antenna 20, the third antenna 30, and the fourth antenna 40 may be linear antennas.

The first antenna 10 and the second antenna 20 are orthogonal to each other, and the path between the first antenna 10 and the mobile terminal 200 may be the same as the path between the second antenna 20 and the mobile terminal 200. The first antenna 10 and the second antenna 20 may be two antennas that are orthogonal at a point at their respective centers. For example, the first antenna 10 and the second antenna 20 may cross-polarization antennas. A cross-polarization antenna is sometimes referred to as being "cross polar." The first antenna 10 and the second antenna 20 may be cross dipole antennas.

The third antenna 30 may be arranged parallel to the first antenna 10. The third antenna 30 and the fourth antenna 40 are orthogonal to each other, and the path between the third antenna 30 and the mobile terminal 200 may be the same as the path between the fourth antenna 40 and the mobile terminal 200. The third antenna 30 and the fourth antenna 40 may be two antennas that are orthogonal to each other at a point at their respective centers. The third antenna 30 and the fourth antenna 40 may be cross-polarization antennas, for example. The third antenna 30 and the fourth antenna 40 may be cross dipole antennas. The first antenna 10, the second antenna 20, the third antenna 30, and the fourth antenna 40 are arranged in the horizontal direction in the order of the first antenna 10 and the second antenna 20 followed by the third antenna 30 and the fourth antenna 40, for example.

The transmission control section 102 is electrically connected to the first antenna 10, the second antenna 20, the third antenna 30, and the fourth antenna 40. The transmission control section 102 may cause symbols to be transmitted from each of the first antenna 10, the second antenna 20, the third antenna 30, and the fourth antenna 40.

Figure 2:
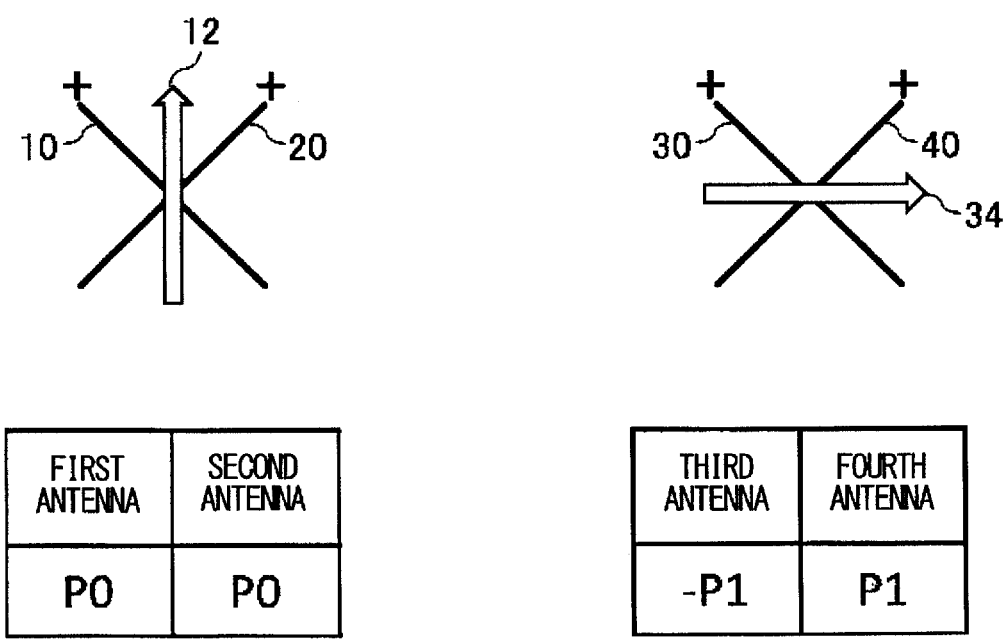
FIG. 2 is a schematic view of exemplary polarization planes formed by the transmission control section via the first antenna, the second antenna, the third antenna, and the fourth antenna.

FIG. 2 is a schematic view of exemplary polarization planes formed by the transmission control section 102 via the first antenna 10, the second antenna 20, the third antenna 30, and the fourth antenna 40. Here, an example is shown in which a set of the first antenna 10 and second antenna 20 and a set of the third antenna 30 and fourth antenna 40 form respective cross-polarization antennas, and each antenna is arranged at an angle of 45° relative to the horizontal plane.

When electric waves having the same phase are output by the first antenna 10 and the second antenna 20, the polarization plane 12 of the electric wave resulting from vector combination has vertical polarization. Furthermore, when electric waves having inverse phases are output from the by the first antenna 10 and the second antenna 20, the polarization plane 12 of the electric wave resulting from vector combination has horizontal polarization. When electric waves having a phase difference therebetween of 90 degrees are output by the first antenna 10 and the second antenna 20, the sum of the vectors rotates over time and has circular polarization. The third antenna 30 and the fourth antenna 40 operate in the same manner.

The transmission control section 102 according to the present embodiment causes the first antenna 10, the second antenna 20, the third antenna 30, and the fourth antenna 40 to each output electric waves at a certain transmission timing, such that the polarization plane 12 formed by the first antenna 10 and the second antenna 20 is orthogonal to the polarization plane 34 formed by the third antenna 30 and the fourth antenna 40.

For example, as shown in FIG. 2, the transmission control section 102 causes the first antenna 10 and the second antenna 20 to output electric waves having the same phase and causes the third antenna 30 and the fourth antenna 40 to output electric waves having inverse phases. In this way, the polarization plane 12 is vertical polarization and the polarization plane 34 is horizontal polarization. As another example, the transmission control section 102 may cause the first antenna 10 and the second antenna 20 to output electric waves having inverse phases and cause the third antenna 30 and the fourth antenna 40 to output electric waves having the same phase. In this way, the polarization plane 12 is horizontal polarization and the polarization plane 34 is vertical polarization.

As a result of the transmission control section 102 causing one of the set of the first antenna 10 and the second antenna 20 and the set of the third antenna 30 and the fourth antenna 40 to output electric waves having the same phase while causing the other to output electric waves having inverse phases in this manner, it is possible to form two polarization planes that are orthogonal to each other.

Figure 3A:
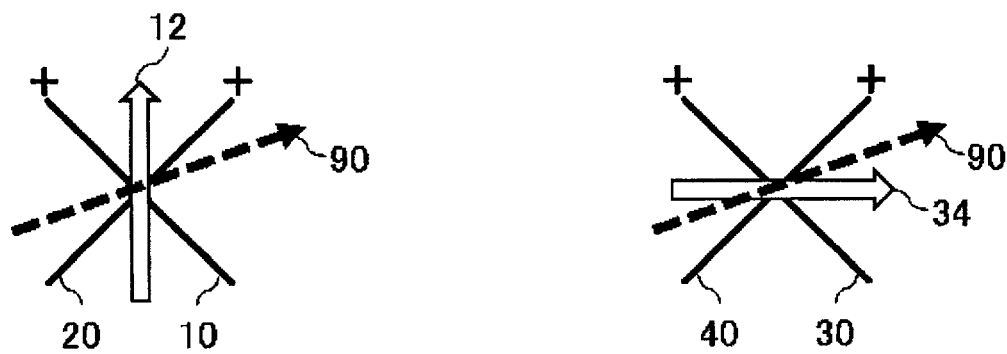
FIGS. 3A and 3B are views for describing reception strength of the mobile terminal for the electrical waves transmitted by the transmission control apparatus.
Figure 3B:
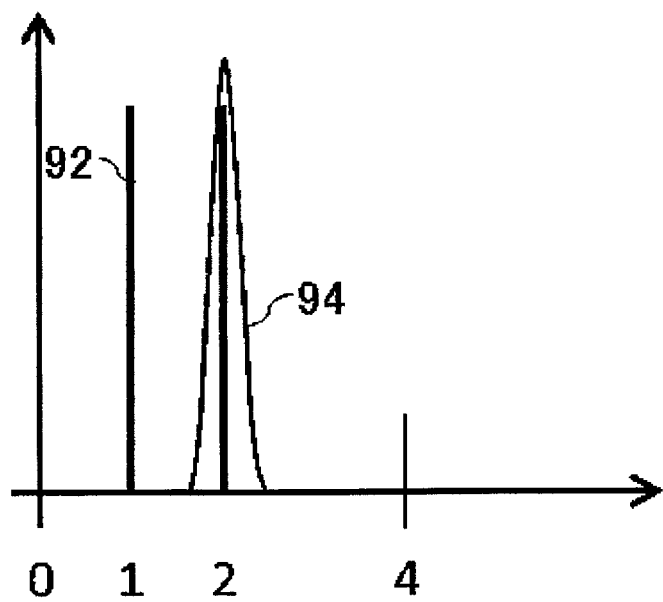

FIGS. 3A and 3B are views for describing reception strength of the mobile terminal 200 for the electrical waves transmitted by the transmission control apparatus 100. With the transmission control apparatus 100 of the present embodiment, the output of the first antenna 10 and the second antenna 20 is set as antenna port 1, the output by the third antenna 30 and the fourth antenna 40 is set as antenna port 2, the polarization plane of the antenna port 1 is orthogonal to the polarization plane of the antenna port 2, and it is possible to realize communication using four antennas and two ports, for example.

For example, when the transmitted electric wave levels of the first antenna 10 and the second antenna 20 are both 1, the transmitted electric wave level of the antenna port 1 is 2. Furthermore, when the transmitted electric wave levels of the third antenna 30 and the fourth antenna 40 are both 1, the transmitted electric wave level of the antenna port 2 is 2.

Here, when the polarization plane 90 of the antenna of the mobile terminal 200 is the direction shown in FIG. 3A, the received electric wave level for the antenna port 1 is a value close to 0, but the received electric wave level for the antenna port 2 is a value close to 2, and so the total is close to 2. No matter what the direction of the polarization plane 90 of the antenna of the mobile terminal 200 is, when the received electric wave level of one of the antenna port 1 and the antenna port 2 is low, the received electric wave level of the other is high. In this way, the transmission control apparatus 100 according to the present embodiment can make the received electric wave level of the mobile terminal 200 be approximately double the transmitted electric wave level of one antenna, by using four antennas to form two antenna ports having orthogonal polarization planes.

FIG. 3B shows a probability density distribution 94 of the received electric wave level of the mobile terminal 200 for the electric wave transmitted by the transmission control apparatus 100 according the present embodiment in a case where the first antenna 10, the second antenna 20, the third antenna 30, and the fourth antenna 40 each have a transmitted electric wave level 92 of 1.

Figure 4:
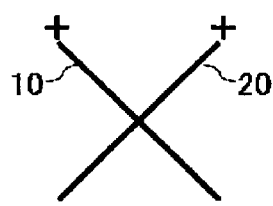
FIG. 4 is a schematic view of exemplary symbols transmitted by the first antenna, the second antenna, the third antenna, and the fourth antenna according to the transmission control section.
Figure 4:
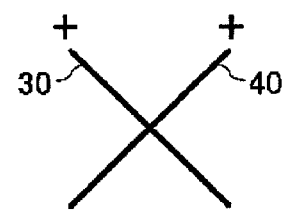

FIG. 4 is a schematic view of exemplary symbols transmitted by the first antenna 10, the second antenna 20, the third antenna 30, and the fourth antenna 40 according to the transmission control section 102. Here, an example is shown in which four-port communication is realized by the four antennas. In this description, the vertical polarization plane formed by the first antenna 10 and the second antenna 20 is the first antenna port, the horizontal polarization plane formed by the third antenna 30 and the fourth antenna 40 is the second antenna port, the horizontal polarization plane formed by the first antenna 10 and the second antenna 20 is the third antenna port, and the vertical polarization plane formed by the third antenna 30 and the fourth antenna 40 is the fourth antenna port.

At the time t=0, the transmission control section 102 causes $+S_1$ to be transmitted from the first antenna 10, $+S_1$ to be transmitted from the second antenna 20, $+S_2$ to be transmitted from the third antenna 30, and $-S_2$ to be transmitted from the fourth antenna 40. As a result, $S_1$ can be transmitted in the vertical polarization plane and $S_2$ can be transmitted in the horizontal polarization plane. Furthermore, at the time t=1, the transmission control section 102 causes $-S_2^*$ (* indicates the complex conjugate) to be transmitted from the first antenna 10, $-S_2^*$ to be transmitted from the second antenna 20, $+S_1^*$ to be transmitted from the third antenna 30, and $-S_1^*$ to be transmitted form the fourth antenna 40. As a result, $S_2^*$ can be transmitted in the vertical polarization plane and $S_1^*$ can be transmitted in the horizontal polarization plane.

At the time t=2, the transmission control section 102 causes $-S_3$ to be transmitted from the first antenna 10, $+S_3$ to be transmitted from the second antenna 20, $+S_4$ to be transmitted from the third antenna 30, and $+S_4$ to be transmitted from the fourth antenna 40. As a result $S_3$ can be transmitted in the horizontal polarization plane and $S_4$ can be transmitted in the vertical polarization plane. At the time t=3, the transmission control section 102 causes $+S_4^*$ to be transmitted from the first antenna 10, $-S_4^*$ to be transmitted from the second antenna 20, $+S_3^*$ to be transmitted from the third antenna 30, and $+S_3^*$ to be transmitted from the fourth antenna 40. As a result, $S_4^*$ can be transmitted in the horizontal polarization plane and $S_3^*$ can be transmitted in the vertical polarization plane.

As described above, at a first transmission timing, the transmission control section 102 according to the present embodiment may cause a first symbol to be transmitted from the first antenna 10, cause a first symbol having the same phase as the first symbol transmitted from the first antenna 10 to be transmitted form the second antenna 20, cause a second symbol to be transmitted from the third antenna 30, and cause a second symbol having the inverse phase of the second symbol transmitted from the third antenna 30 to be transmitted from the fourth antenna 40 and, at a second transmission timing that is after the first transmission timing, cause the complex conjugate of the second symbol having the inverse phase of the second symbol transmitted from the third antenna 30 at the first transmission timing to be transmitted from the first antenna 10, cause the complex conjugate of the second symbol having the same phase as the complex conjugate of the second symbol transmitted from the first antenna 10 to be transmitted from the second antenna 20, cause the complex conjugate of the first symbol having the same phase as the first symbol transmitted from the first antenna 10 at the first transmission timing to be transmitted from the third antenna 30, and cause the complex conjugate of the first symbol having the inverse phase of the complex conjugate of the first symbol transmitted from the third antenna 30 to be transmitted from the fourth antenna 40.

Furthermore, at a third transmission timing that is after the second transmission timing, the transmission control section 102 may cause a the third symbol to be transmitted from the second antenna 20, cause the third symbol having the inverse phase of the third symbol transmitted from the second antenna 20 to be transmitted from the first antenna 10, cause a fourth symbol to be transmitted from the fourth antenna 40, and cause the fourth symbol having the same phase as the fourth symbol transmitted from the fourth antenna 40 to be transmitted from the third antenna 30 and, at a fourth transmission timing that is after the third transmission timing, cause the complex conjugate of the fourth symbol having the inverse phase of the fourth symbol transmitted from the fourth antenna 40 at the third transmission timing to be output from the second antenna 20, cause the complex conjugate of the fourth symbol having the inverse phase of the complex conjugate of the fourth symbol transmitted from the second antenna 20 to be output from the first antenna 10, cause the complex conjugate of the third symbol having the same phase as the third symbol transmitted from the second antenna 20 at the third transmission timing to be transmitted from the fourth antenna 40, and cause the complex conjugate of the third symbol having the same phase as the complex conjugate of the third symbol transmitted from the fourth antenna 40 to be transmitted from the third antenna 30.

Conventionally, when realizing four-port communication using four antennas, the symbols are transmitted by the antennas such that transmission from three or more antennas at the same time does not occur, such as shown in Table 1 below. In the table, 0 indicates that transmission is not performed.

TABLE 1

| | FIRST ANTENNA | SECOND ANTENNA | THIRD ANTENNA | FOURTH ANTENNA |
|---|---|---|---|---|
| t = 0 | $S_1$ | 0 | $S_2$ | 0 |
| t = 1 | $-S_2^*$ | 0 | $S_1^*$ | 0 |
| t = 2 | 0 | $S_3$ | 0 | $S_4$ |
| t = 3 | 0 | $-S_4^*$ | 0 | $S_3^*$ |
| . | . | . | . | . |
| . | . | . | . | . |
| . | . | . | . | . |

In contrast to this, with the transmission control apparatus 100 according to the present embodiment, it is possible to improve the gain by approximately 3 dB by transmitting symbols from four antennas at each transmission timing, it is possible to prevent the occurrence of nulls by adopting Alamouti encoding while treating the number of antenna ports to be 2 at each transmission timing, and it is possible to maintain the orthogonal relationship between the antenna ports. Accordingly, with the transmission control apparatus 100 according to the present embodiment, it is possible to realize data transmission using four antennas that is more efficient than conventional data transmission.

Figure 5:
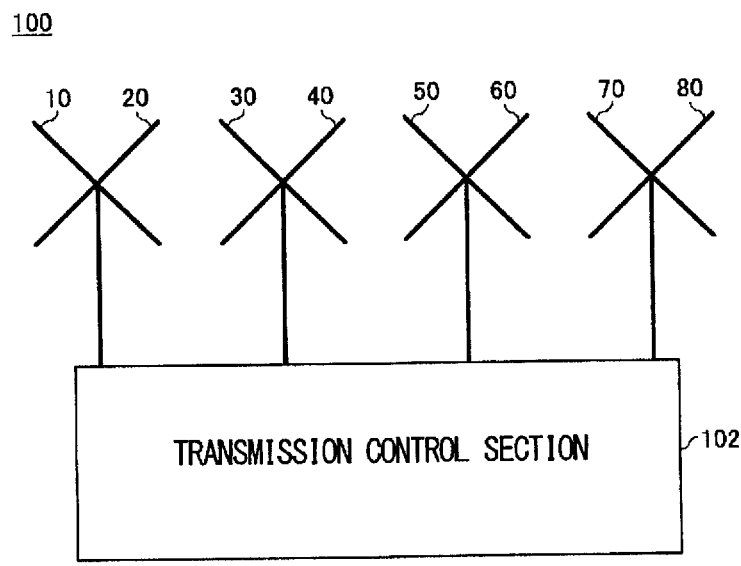
FIG. 5 is a schematic view of another exemplary function configuration of the transmission control apparatus.
Figure 5:
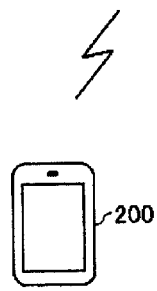

FIG. 5 is a schematic view of another exemplary function configuration of the transmission control apparatus 100. The transmission control apparatus 100 shown in FIG. 5 includes a first antenna 10, a second antenna 20, a third antenna 30, a fourth antenna 40, a fifth antenna 50, a sixth antenna 60, a seventh antenna 70, an eighth antenna 80, and a transmission control section 102. The first antenna 10, the second antenna 20, the third antenna 30, the fourth antenna 40, the fifth antenna 50, the sixth antenna 60, the seventh antenna 70, and the eighth antenna 80 are arranged in the horizontal direction in the order of the first antenna 10 and the second antenna 20, followed by the third antenna 30 and the fourth antenna 40, followed by the fifth antenna 50 and the sixth antenna 60, followed by the seventh antenna 70 and the eighth antenna 80.

Figure 6:
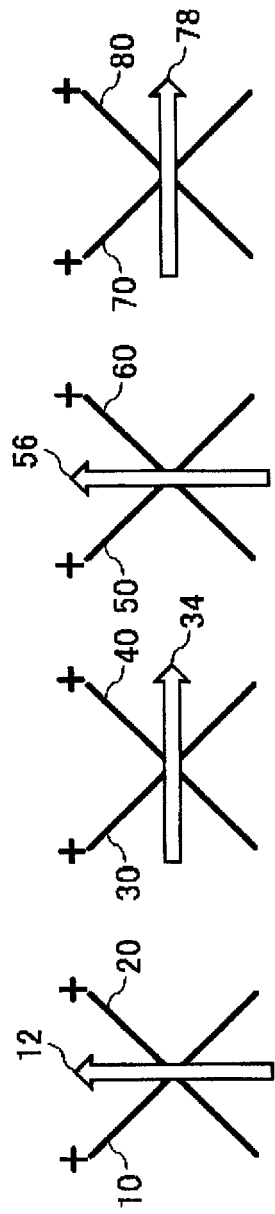
FIG. 6 is a schematic view showing exemplary polarization planes formed by the transmission control section via the first antenna, the second antenna, the third antenna, the fourth antenna, the fifth antenna, the sixth antenna, the seventh antenna, and the eighth antenna.

FIG. 6 is a schematic view showing exemplary polarization planes formed by the transmission control section 102 via the first antenna 10, the second antenna 20, the third antenna 30, the fourth antenna 40, the fifth antenna 50, the sixth antenna 60, the seventh antenna 70, and the eighth antenna 80. Here, an example is describe in which the first antenna 10 and second antenna 20, the third antenna 30 and fourth antenna 40, the fifth antenna 50 and sixth antenna 60, and the seventh antenna 70 and eighth antenna 80 each form cross-polarization antennas, and each antenna is arranged at an angle of 45° relative to the horizontal plane.

At a certain transmission timing, the transmission control section 102 according to the present embodiment may cause each of the first antenna 10, the second antenna 20, the third antenna 30, the fourth antenna 40, the fifth antenna 50, the sixth antenna 60, the seventh antenna 70, and the eighth antenna 80 to output an electric wave such that the polarization plane 12 formed by the first antenna 10 and the second antenna 20 is orthogonal to the polarization plane 34 formed by the third antenna 30 and the fourth antenna 40 and the polarization plane 56 formed by the fifth antenna 50 and the sixth antenna 60 is orthogonal to the polarization plane 78 formed by the seventh antenna 70 and the eighth antenna 80.

For example, as shown in FIG. 6, the transmission control section 102 causes the first antenna 10 and the second antenna 20 to output electric waves having the same phase, causes the third antenna 30 and the fourth antenna 40 to output electric waves having inverse phases, causes the fifth antenna 50 and the sixth antenna 60 to output electric waves having the same phase, and causes the seventh antenna 70 and the eighth antenna 80 to output electric waves having the same phase, such that the polarization plane 78 and the polarization plane 34 have the same phase. As a result, the polarization plane 12 and the polarization plane 56 are vertical polarization having the same phase, and the polarization plane 34 and the polarization plane 78 are horizontal polarization having the same phase. As another example, the transmission control section 102 may cause the first antenna 10 and the second antenna 20 to output electric waves having the same phase, cause the third antenna 30 and the fourth antenna 40 to output electric waves having inverse phases, cause the fifth antenna 50 and the sixth antenna 60 to output electric waves having the same phase, and causes the seventh antenna 70 and the eighth antenna 80 to output electric waves having inverse phases, such that the polarization plane 78 and the polarization plane 34 have inverse phases. As a result, the polarization plane 12 and the polarization plane 56 are vertical polarization having the same phase, and the polarization plane 34 and the polarization plane 78 are horizontal polarization having inverse phases.

With the transmission control apparatus 100 according to the present embodiment, the output from the first antenna 10, the second antenna 20, the third antenna 30, and the fourth antenna 40 can be the first antenna port and the output from the fifth antenna 50, the sixth antenna 60, the seventh antenna 70, and the eighth antenna 80 can be the second antenna port, such that communication is realized using eight antennas and two ports. The polarization planes of the electric waves received by the mobile terminal 200 from the first antenna port depend on the positional relationship between the mobile terminal 200 and the first antenna 10, second antenna 20, third antenna 30, and fourth antenna 40, and the polarization planes of the electric waves received by the mobile terminal 200 from the second antenna port depend on the positional relationship between the mobile terminal 200 and the fifth antenna 50, sixth antenna 60, seventh antenna 70, and eighth antenna 80. For example, linear polarization occurs at a certain angle, circular polarization occurs at a certain angle, and elliptical polarization occurs at a certain angle. With the transmission control apparatus 100 according to the present embodiment, by adjusting the distance between the group including the first antenna 10, the second antenna 20, the third antenna 30, and the fourth antenna 40 and the group including the fifth antenna 50, the sixth antenna 60, the seventh antenna 70, and the eighth antenna 80 and the polarization planes of the first antenna port and the second antenna port, it is possible to cause the polarization plane of the electric waves received from the first antenna port and the polarization plane of the electric waves received from the second antenna port to be orthogonal to each other for any angle. The distance between the group including the first antenna 10, the second antenna 20, the third antenna 30, and the fourth antenna 40 and the group including the fifth antenna 50, the sixth antenna 60, the seventh antenna 70, and the eighth antenna 80 may be set to be $\lambda/4$, $\lambda/2$, or the like.

Figure 7:
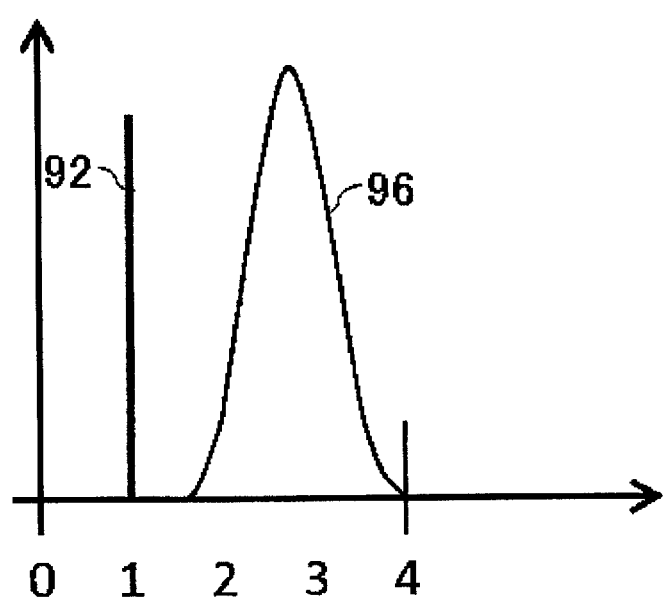
FIG. 7 is a schematic view of an exemplary probability density distribution for the received electric wave level received by the mobile terminal in a case where communication with eight antennas and two ports is realized using the transmission control apparatus.

FIG. 7 is a schematic view of an exemplary probability density distribution 96 for the received electric wave level received by the mobile terminal 200 in a case where communication using eight antennas and two ports is realized by the transmission control apparatus 100. When the transmitted electric wave level is 1 for each antenna, the total transmitted electric wave level is 4 for each of the antenna port 1 and the antenna port 2. With the transmission control apparatus 100 of the present embodiment, the polarization plane of the electric waves received from the first antenna port by the mobile terminal 200 is orthogonal to the polarization plane of the electric waves received from the second antenna port, and the polarization plane 12 and polarization plane 34 are orthogonal to the polarization plane 56 and polarization plane 78, and therefore the received electric wave level received by the mobile terminal 200 has a distribution from 2 to 4, as shown in FIG. 7.

Figure 8:
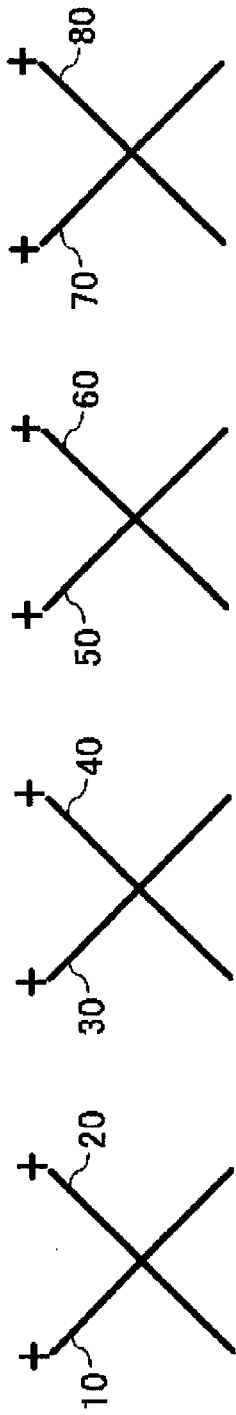
FIG. 8 is a schematic view of exemplary symbols transmitted from the first antenna, the second antenna, the third antenna, the fourth antenna, the fifth antenna, the sixth antenna, the seventh antenna, and the eighth antenna by the transmission control section.

FIG. 8 is a schematic view of exemplary symbols transmitted from the first antenna 10, the second antenna 20, the third antenna 30, the fourth antenna 40, the fifth antenna 50, the sixth antenna 60, the seventh antenna 70, and the eighth antenna 80 by the transmission control section 102. Here, an example is described in which four-port communication is realized using eight antennas. In this description, the vertical polarization plane formed by the first antenna 10 and the second antenna 20 and the horizontal polarization plane formed by the third antenna 30 and the fourth antenna 40 are the first antenna port, the horizontal polarization plane formed by the first antenna 10 and the second antenna 20 and the vertical polarization plane formed by the third antenna 30 and the fourth antenna 40 are the second antenna port, the vertical polarization plane formed by the fourth antenna 40 and the fifth antenna 50 and the horizontal polarization plane formed by the sixth antenna 60 and the seventh antenna 70 are the third antenna port, and the horizontal polarization plane formed by the fourth antenna 40 and the fifth antenna 50 and the vertical polarization plane formed by the sixth antenna 60 and the seventh antenna 70 are the fourth antenna port.

At the time t=0, the transmission control section 102 causes $+S_1$ to be transmitted from the first antenna 10, $+S_1$ to be transmitted from the second antenna 20, $-S_1$ to be transmitted from the third antenna 30, $+S_1$ to be transmitted from the fourth antenna 40, $+S_2$ to be transmitted from the fifth antenna 50, $+S_2$ to be transmitted from the sixth antenna 60, $+S_2$ to be transmitted from the seventh antenna 70, and $-S_2$ to be transmitted from the eighth antenna 80. Furthermore, at the time t=1, the transmission control section 102 causes $-S_2^*$ to be transmitted from the first antenna 10, $-S_2^*$ to be transmitted from the second antenna 20, $+S_2^*$ to be transmitted from the third antenna 30, $-S_2^*$ to be transmitted from the fourth antenna 40, $+S_2^*$ to be transmitted from the fifth antenna 50, $+S_2^*$ to be transmitted from the sixth antenna 60, $+S_2^*$ to be transmitted from the seventh antenna 70, and $-S_2^*$ to be transmitted from the eighth antenna 80. At the time t=2, the transmission control section 102 causes $+S_3$ to be transmitted from the first antenna 10, $-S_3$ to be transmitted from the second antenna 20, $+S_3$ to be transmitted from the third antenna 30, $+S_3$ to be transmitted from the fourth antenna 40, $-S_4$ to be transmitted from the fifth antenna 50, $+S_4$ to be transmitted from the sixth antenna 60, $+S_4$ to be transmitted from the seventh antenna 70, and $+S_4$ to be transmitted from the eighth antenna 80. At the time t=3, the transmission control section 102 causes $-S_4^*$ to be transmitted from the first antenna 10, $+S_4^*$ to be transmitted from the second antenna 20, $-S_4^*$ to be transmitted from the third antenna 30, $-S_4^*$ to be transmitted from the fourth antenna 40, $-S_3^*$ to be transmitted from the fifth antenna 50, $+S_3^*$ to be transmitted from the sixth antenna 60, $+S_3^*$ to be transmitted from the seventh antenna 70, and $+S_3^*$ to be transmitted from the eighth antenna 80.

In this way, as shown in FIG. 8, at each timing it is possible to cause the polarization plane formed by the first antenna 10 and the second antenna 20 to be orthogonal to the polarization plane formed by the third antenna 30 and the fourth antenna 40 and to cause the polarization plane formed by the fifth antenna 50 and the sixth antenna 60 to be orthogonal to the polarization plane formed by the seventh antenna 70 and the eighth antenna 80. As a result, the polarization planes of the electric waves received by the mobile terminal 200 from the first antenna port and the second antenna port depend on the positional relationship between the mobile terminal 200 and the first antenna 10, second antenna 20, third antenna 30, and fourth antenna 40, and the polarization planes of the electric waves received by the mobile terminal 200 from the third antenna port and the fourth antenna port depend on the positional relationship between the mobile terminal 200 and the fifth antenna 50, sixth antenna 60, seventh antenna 70, and eighth antenna 80. For example, linear polarization occurs at a certain angle, circular polarization occurs at a certain angle, and elliptical polarization occurs at a certain angle. With the transmission control apparatus 100 according to the present embodiment, by adjusting the distance between the group including the first antenna 10, the second antenna 20, the third antenna 30, and the fourth antenna 40 and the group including the fifth antenna 50, the sixth antenna 60, the seventh antenna 70, and the eighth antenna 80 and the polarization planes of the first antenna port, the second antenna port, the third antenna port, and the fourth antenna port, it is possible to cause the polarization plane of the electric waves received from the first antenna port and the polarization plane of the electric waves received from the third antenna port to be orthogonal to each other and to cause the polarization plane of the electric waves received from the second antenna port and the polarization plane of the electric waves received from the fourth antenna port to be orthogonal to each other, for any angle. The distance between the group including the first antenna 10, the second antenna 20, the third antenna 30, and the fourth antenna 40 and the group including the fifth antenna 50, the sixth antenna 60, the seventh antenna 70, and the eighth antenna 80 may be set to be $\lambda/4$, $\lambda/2$, or the like.

As described above, at the first transmission timing, the transmission control section 102 according to the present embodiment may cause a first symbol to be transmitted from the first antenna 10, cause the first symbol having the same phase as the first symbol transmitted from the first antenna 10 to be transmitted form the second antenna 20, cause the first symbol having the same phase as the first symbol transmitted from the first antenna 10 to be transmitted from one of the third antenna 30 and the fourth antenna 40, cause the first symbol having the inverse phase of the first symbol transmitted from the first antenna 10 to be transmitted from the other of the third antenna 30 and the fourth antenna 40, cause a second symbol to be transmitted from the fifth antenna 50, cause the second symbol having the same phase as the second symbol transmitted from the fifth antenna 50 to be transmitted from the sixth antenna 60, cause the second symbol having the same phase as the second symbol transmitted from the fifth antenna 50 to be transmitted from one of the seventh antenna 70 and the eighth antenna 80, and cause the second symbol having the inverse phase of the second symbol transmitted from the fifth antenna 50 to be transmitted from the other of the seventh antenna 70 and the eighth antenna 80.

As another example, at the first transmission timing, the transmission control section 102 may cause a first symbol to be transmitted from the first antenna 10, cause the first symbol having the same phase as the first symbol transmitted from the first antenna 10 to be transmitted form the second antenna 20, cause the first symbol having the inverse phase of the first symbol transmitted from the first antenna 10 to be transmitted from the third antenna 30, cause the first symbol having the same phase as the first symbol transmitted from the first antenna 10 to be transmitted from the fourth antenna 40, cause a second symbol to be transmitted from the fifth antenna 50, cause the second symbol having the same phase as the second symbol transmitted from the fifth antenna 50 to be transmitted from the sixth antenna 60, cause the second symbol having the same phase as the second symbol transmitted from the fifth antenna 50 to be transmitted from the seventh antenna 70, and cause the second symbol having the inverse phase of the second symbol transmitted from the fifth antenna 50 to be transmitted from the eighth antenna 80. Then, at the second transmission timing that is after the first transmission timing, the transmission control section 102 may cause the complex conjugate of the second symbol having the inverse phase of the second symbol transmitted from the fifth antenna 50 at the first transmission timing to be transmitted from the first antenna 10, cause the complex conjugate of the second symbol having the same phase as the complex conjugate of the second symbol transmitted from the first antenna 10 to be transmitted form the second antenna 20, cause the complex conjugate of the second symbol having the inverse phase of the complex conjugate of the second symbol transmitted from the first antenna 10 to be transmitted from the third antenna 30, cause the complex conjugate of the second symbol having the same phase as the complex conjugate of the second symbol transmitted from the first antenna 10 to be transmitted from the fourth antenna 40, cause the complex conjugate of the first symbol having the same phase as the first symbol transmitted from the first antenna 10 at the first transmission timing to be transmitted from the fifth antenna 50, cause the complex conjugate of the first symbol having the same phase as the complex conjugate of the first symbol transmitted from the fifth antenna 50 to be transmitted from the sixth antenna 60, cause the complex conjugate of the first symbol having the same phase as the complex conjugate of the first symbol transmitted from the fifth antenna 50 to be transmitted from the seventh antenna 70, and cause the complex conjugate of the first symbol having the inverse phase of the complex conjugate of the first symbol transmitted from the fifth antenna 50 to be transmitted from the eighth antenna 80.

Furthermore, at the second transmission timing that is after the third transmission timing, the transmission control section 102 may cause a third symbol to be transmitted from the third antenna 30, cause the third symbol having the same phase as the third symbol transmitted from the third antenna 30 to be transmitted form the fourth antenna 40, cause the third symbol having the same phase as the third symbol transmitted from the third antenna 30 to be transmitted from the first antenna 10, cause the third symbol having the inverse phase of the third symbol transmitted from the third antenna 30 to be transmitted from the second antenna 20, cause a fourth symbol to be transmitted from the seventh antenna 70, cause the fourth symbol having the same phase as the fourth symbol transmitted from the seventh antenna 70 to be transmitted from the eighth antenna 80, cause the fourth symbol having the inverse phase of the fourth symbol transmitted from the fifth antenna 50 to be transmitted from the seventh antenna 70, and cause the fourth symbol having the same phase as the fourth symbol transmitted from the seventh antenna 70 to be transmitted from the sixth antenna 60.

At the fourth transmission timing that is after the third transmission timing, the transmission control section 102 may cause the complex conjugate of the fourth symbol having the inverse phase of the fourth symbol transmitted from the seventh antenna 70 at the third transmission timing to be transmitted from the third antenna 30, cause the complex conjugate of the fourth symbol having the same phase as the complex conjugate of the fourth symbol transmitted from the third antenna 30 to be transmitted form the fourth antenna 40, cause the complex conjugate of the fourth symbol having the same phase as the complex conjugate of the fourth symbol transmitted from the third antenna 30 to be transmitted from the first antenna 10, cause the complex conjugate of the fourth symbol having the inverse phase of the complex conjugate of the fourth symbol transmitted from the third antenna 30 to be transmitted from the second antenna 20, cause the complex conjugate of the third symbol having the same phase as the third symbol transmitted from the third antenna 30 at the third transmission timing to be transmitted from the seventh antenna 70, cause the complex conjugate of the third symbol having the same phase as the complex conjugate of the third symbol transmitted from the seventh antenna 70 to be transmitted from the eighth antenna 80, cause the complex conjugate of the third symbol having the inverse phase of the complex conjugate of the third symbol transmitted from the seventh antenna 70 to be transmitted from the fifth antenna 50, and cause the complex conjugate of the third symbol having the same phase as the complex conjugate of the third symbol transmitted from the seventh antenna 70 to be transmitted from the sixth antenna 60.

In the above description, each component of the transmission control apparatus 100 may be realized by hardware or may be realized by software. Furthermore, each component may be realized by a combination of software and hardware. A computer may be made to function as the transmission control apparatus 100 by executing a program. The program may be installed on the computer functioning as at least a portion of the transmission control apparatus 100, from a storage apparatus connected to a network or from a computer readable medium.

The program that is installed on the computer and causes the computer to function as the transmission control apparatus 100 according to the present embodiment affects the CPU and the like to cause the computer to function as each component of the transmission control apparatus 100. The information processes recorded in these programs are read by the computer to function as a specific means realized by the cooperation of software and hardware resources of the transmission control apparatus 100.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

LIST OF REFERENCE NUMERALS

10: first antenna, 12: polarization plane, 20: second antenna, 30: third antenna, 34: polarization plane, 40: fourth antenna, 50: fifth antenna, 56: polarization plane, 60: sixth antenna, 70: seventh antenna, 78: polarization plane, 80: eighth antenna, 100: transmission control apparatus, 102: transmission control section, 200: mobile terminal

What is claimed is:

1. A non-transitory computer readable medium storing thereon a program that causes a computer to perform operations comprising:
(i) at a first transmission timing,
causing a first symbol to be transmitted from a first antenna;
causing the first symbol to be transmitted from a second antenna having the same phase as the first symbol transmitted from the first antenna, the second antenna being orthogonal to the first antenna and a path between the second antenna and a mobile terminal capable of wireless communication with the computer being the same as a path between the first antenna and the mobile terminal;
causing a second symbol to be transmitted from a third antenna arranged parallel to the first antenna; and
causing the second symbol to be transmitted from a fourth antenna having the inverse phase of the second symbol transmitted from the third antenna, the fourth antenna being orthogonal to the third antenna and a path between the fourth antenna and the mobile terminal being the same as a path between the third antenna and the mobile terminal, and
(ii) at a second transmission timing that is after the first transmission timing,
causing a complex conjugate of the second symbol to be transmitted from the first antenna having the inverse phase of the second symbol transmitted from the third antenna at the first transmission timing,
causing the complex conjugate of the second symbol to be transmitted from the second antenna having the same phase as the complex conjugate of the second symbol transmitted from the first antenna,
causing a complex conjugate of the first symbol to be transmitted from the third antenna having the same phase as the first symbol transmitted from the first antenna at the first transmission timing, and
causing the complex conjugate of the first symbol to be transmitted from the fourth antenna having the inverse phase of the complex conjugate of the first symbol transmitted from the third antenna.

2. A transmission control apparatus comprising:
the non-transitory computer readable medium according to claim 1;
the first antenna;
the second antenna;
the third antenna;
the fourth antenna; and
the computer.

3. The transmission control apparatus according to claim 2, wherein the first antenna and the second antenna form a cross-polarization antenna, and
the third antenna and the fourth antenna form a cross-polarization antenna.

4. The computer readable medium according to claim 1, wherein the operations further comprise:
(iii) at a third transmission timing that is after the second transmission timing,
causing a third symbol to be transmitted from the second antenna,
causing the third symbol to be transmitted from the first antenna having the inverse phase of the third symbol transmitted from the second antenna,
causing a fourth symbol to be transmitted from the third antenna, and
causing the fourth symbol to be transmitted from the fourth antenna having the same phase as the fourth symbol transmitted from the third antenna, and
(iv) at a fourth transmission timing that is after the third transmission timing,
causing a complex conjugate of the fourth symbol to be transmitted from the first antenna having the same phase as the fourth symbol transmitted from the third antenna at the third transmission timing,
causing the complex conjugate of the fourth symbol to be transmitted from the second antenna having the inverse phase of the complex conjugate of the fourth symbol transmitted from the first antenna, causing a complex conjugate of the third symbol to be transmitted from the third antenna having the same phase as the third symbol transmitted from the second antenna at the third transmission timing, and causing the complex conjugate of the third symbol to be transmitted from the fourth antenna having the same phase as the complex conjugate of the third symbol transmitted from the third antenna.

5. A non-transitory computer readable medium storing thereon a program that causes a computer to perform operations comprising:

causing a first symbol to be transmitted from a first antenna;

causing the first symbol to be transmitted from a second antenna having the same phase as the first symbol transmitted from the first antenna, the second antenna being orthogonal to the first antenna and a path between the second antenna and a mobile terminal capable of wireless communication with the computer being the same as a path between the first antenna and the mobile terminal;

causing the first symbol to be transmitted from one of a third antenna and a fourth antenna having the same phase as the first symbol transmitted from the first antenna, and causing the first symbol to be transmitted from the other of the third antenna and the fourth antenna having the inverse phase of the first symbol transmitted from the first antenna, the third antenna being arranged parallel to the first antenna, the fourth antenna being orthogonal to the third antenna, and a path between the fourth antenna and the mobile terminal being the same as a path between the third antenna and the mobile terminal;

causing a second symbol to be transmitted from a fifth antenna arranged parallel to the first antenna;

causing the second symbol to be transmitted from a sixth antenna having the same phase as the second symbol transmitted from the fifth antenna, the sixth antenna being orthogonal to the fifth antenna and a path between the sixth antenna and the mobile terminal being the same as a path between the fifth antenna and the mobile terminal; and causing the second symbol to be transmitted from one of a seventh antenna and an eighth antenna having the same phase as the second symbol transmitted from the fifth antenna, and causing the second symbol to be transmitted from the other of the seventh antenna and the eighth antenna having the inverse phase of the second symbol transmitted from the fifth antenna, the seventh antenna being arranged parallel to the first antenna, the eighth antenna being orthogonal to the seventh antenna, and a path between the eighth antenna and the mobile terminal being the same as a path between the seventh antenna and the mobile terminal.

6. A transmission control apparatus comprising:
the non-transitory computer readable medium according to claim 5;
the first antenna;
the second antenna;
the third antenna;
the fourth antenna;
the fifth antenna;
the sixth antenna;
the seventh antenna;
the eighth antenna; and
the computer.

7. The computer readable medium according to claim 5, wherein
the operations including:
causing the first symbol to be transmitted from the first antenna,
causing the first symbol to be transmitted from the second antenna having the same phase as the first symbol transmitted from the first antenna,
causing the first symbol to be transmitted from the third antenna having the inverse phase of the first symbol transmitted from the first antenna,
causing the first symbol to be transmitted from the fourth antenna having the same phase as the first symbol transmitted from the first antenna,
causing the second symbol to be transmitted from the fifth antenna,
causing the second symbol to be transmitted from the sixth antenna having the same phase as the second symbol transmitted from the fifth antenna,
causing the second symbol to be transmitted from the seventh antenna having the same phase as the second symbol transmitted from the fifth antenna, and
causing the second symbol to be transmitted from the eighth antenna having the inverse phase of the second symbol transmitted from the fifth antenna,
are performed at a first transmission timing, and
the operations including:
causing a complex conjugate of the second symbol to be transmitted from the first antenna having the inverse phase of the second symbol transmitted from the fifth antenna at the first transmission timing,
causing the complex conjugate of the second symbol to be transmitted from the second antenna having the same phase as the complex conjugate of the second symbol transmitted from the first antenna,
causing the complex conjugate of the second symbol to be transmitted from the third antenna having the inverse phase of the complex conjugate of the second symbol transmitted from the first antenna,
causing the complex conjugate of the second symbol to be transmitted from the fourth antenna having the same phase as the complex conjugate of the second symbol transmitted from the first antenna,
causing a complex conjugate of the first symbol to be transmitted from the fifth antenna having the same phase as the first symbol transmitted from the first antenna at the first transmission timing,
causing the complex conjugate of the first symbol to be transmitted from the sixth antenna having the same phase as the complex conjugate of the first symbol transmitted from the fifth antenna,
causing the complex conjugate of the first symbol to be transmitted from the seventh antenna having the same phase as the complex conjugate of the first symbol transmitted from the fifth antenna, and
causing the complex conjugate of the first symbol to be transmitted from the eighth antenna having the inverse phase of the complex conjugate of the first symbol transmitted from the fifth antenna,
are performed at a second transmission timing that is after the first transmission timing.

8. The transmission control apparatus according to claim 6, wherein
the first antenna and the second antenna form a cross-polarization antenna, the third antenna and the fourth antenna form a cross-polarization antenna, the fifth antenna and the sixth antenna form a cross-polarization antenna, and the seventh antenna and the eighth antenna form a cross-polarization antenna.

* * * * *